US011360805B1

(12) United States Patent
Oliver

(10) Patent No.: US 11,360,805 B1
(45) Date of Patent: Jun. 14, 2022

(54) PROJECT DISCOVERY FOR AUTOMATED COMPILATION, TESTING, AND PACKAGING OF APPLICATIONS

(71) Applicant: Workday, Inc., Pleasanton, CA (US)

(72) Inventor: Brian Oliver, Acton, MA (US)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 16/926,491

(22) Filed: Jul. 10, 2020

(51) Int. Cl.
*G06F 9/48* (2006.01)
*G06F 9/445* (2018.01)
*G06F 8/77* (2018.01)
*G06F 8/61* (2018.01)
*G06F 8/71* (2018.01)
*G06F 16/13* (2019.01)

(52) U.S. Cl.
CPC .............. *G06F 9/4843* (2013.01); *G06F 8/61* (2013.01); *G06F 8/71* (2013.01); *G06F 8/77* (2013.01); *G06F 9/44526* (2013.01); *G06F 16/13* (2019.01)

(58) Field of Classification Search
USPC ......................................................... 717/101
See application file for complete search history.

(56) References Cited

U.S. PATENT DOCUMENTS

| 8,732,714 B2 | 5/2014 | Vaidya |
| 2006/0136881 A1 | 6/2006 | Nesbitt |
| 2018/0196867 A1 | 7/2018 | Wiesmaier |
| 2019/0213551 A1 | 7/2019 | Zhou |
| 2020/0218514 A1* | 7/2020 | Wang ............... G06F 16/2282 |

FOREIGN PATENT DOCUMENTS

| AU | 5900599 A | * 3/2000 | ............ G06F 9/445 |
| WO | 0016195 | 3/2000 | |

OTHER PUBLICATIONS

Gradle5.6.4, "The Java Plugin", 2019, Published by Gradle (Year: 2019).
Kainulainen1, "Getting Started With Gradle: Our First JavaProject", 2014, Published at https://www.petrikainulainen.net/programming/gradle/getting-started-with-gradle-our-first-java-project/ (Year: 2014).
Stackoverflow, "Parallel Task For Tree structure", 2010, Published by Stack Overflow (Year: 2010).
Stackoverflow3, "Is it possible to run two independent gradle tasks from samesubproject in parallel?", 2018, Published by Stack Overflow (Year: 2018).
Villar, "Graphs, Gradle and Talaiot", 2019, Published at https://proandroiddev.com/graphs-gradle-and-talaiot-b0c02c50d2b1 (Year: 2019).

* cited by examiner

*Primary Examiner* — John Q Chavis
(74) *Attorney, Agent, or Firm* — Van Pelt, Yi & James LLP

(57) ABSTRACT

A system for discovering a task list includes an interface and a processor. The interface is configured to receive an indication of a start directory and a set of plugins, wherein the set of plugins is used to determine the task list associated with compiling, testing, packaging, and/or deploying a program. The processor is configured to determine a set of directories for discovering the task list based at least in part on the start directory; for each directory of the set of directories: for each plugin of the set of plugins: apply a selected plugin of the set of plugins to a selected directory of the set of directories to generate a set of tasks; add the set of tasks to the task list; and provide the task list.

17 Claims, 14 Drawing Sheets

PROJECT DISCOVERY FOR AUTOMATED COMPILATION, TESTING, AND PACKAGING OF APPLICATIONS

BACKGROUND OF THE INVENTION

A typical software project includes a number of different source code components. For example, a project often comprises source code to be compiled into the final product, source code for testing the project, source code providing information for packaging, source code defining project dependencies etc. When a project is built, a set of tools perform the necessary steps in order to create the final product from the different types of source code. Typically a build tool utilizes special project source code known as a script or a set of scripts for coordinating the build process, executing specific instructions for each of the different types of source code in a project. For example, the scripts comprise instructions for compilation, testing, packaging, deploying, etc., fetching necessary dependencies, performing authentication key, establishing build output paths, etc. Writing and maintaining these scripts becomes a tedious and time-consuming task for developers, as it has to be performed in addition to writing the project source code, thus reducing overall productivity. In addition, a situation can occur wherein an upgraded version of a programming language is no longer compatible with an established build tool, creating a problem wherein the scripts are required to be ported to the new build solution. For a large enterprise software tool, this operation can consume a very large amount of engineer time.

BRIEF DESCRIPTION OF THE DRAWINGS

Various embodiments of the invention are disclosed in the following detailed description and the accompanying drawings.

DETAILED DESCRIPTION

Figure 1:
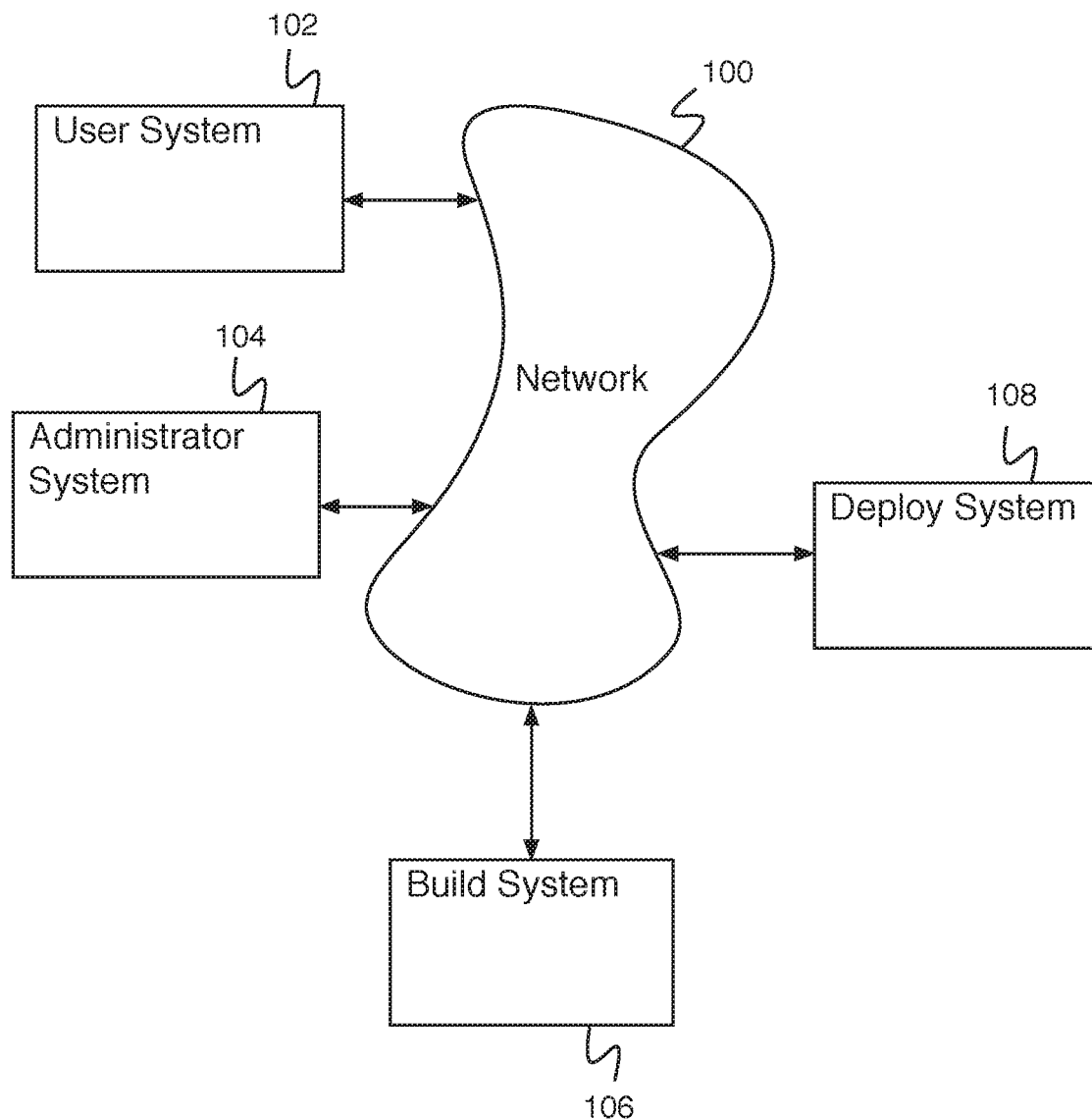
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for discovering a task list comprises an interface configured to receive an indication of a start directory and a set of plugins, wherein the set of plugins is used to determine the task list associated with a program, and a processor configured to determine a set of directories for discovering the task list based at least in part on the start directory, for each directory of the set of directories, for each plugin of the set of plugins, apply a selected plugin of the set of plugins to a selected directory of the set of directories to generate a set of tasks, add the set of tasks to the task list, and provide the task list. In various embodiments, tasks include a compiling task, a testing task, a packaging task, a deploying task, a documentation task, a code signing task, a code auditing task, or any other appropriate task(s).

A system for determining a dependency task tree comprises an interface configured to receive a task list, wherein the task list is associated with compiling, testing, packaging, and/or deploying a program, and a processor configured to determine a dependency task tree, wherein the dependency task tree includes all tasks in the task list and all prerequisite tasks for each task in the task list, and provide the dependency task tree.

A system for executing a dependency task tree comprises an interface configured to receive the dependency task tree, wherein the dependency task tree includes tasks associated with compiling, testing, packaging, and/or deploying a program, and a processor configured to determine a set of tasks of the dependency task tree such that a task of the set of tasks does not depend on any other task, add the set of tasks to a task queue, begin executing tasks from the task queue, receive an indication of a completed task, determine a dependent task that depends on the completed task, in response to determining that all dependencies of the dependent task are completed, add the dependent task to the task queue, and continue executing tasks from the task queue until all tasks in the dependency task tree are completed.

A system for building software comprises an automated system for discovering a task list, determining a dependency task tree, and executing the dependency task tree. In some embodiments, discovering a task list, determining a dependency task tree, and executing the dependency task tree comprises automated compilation, testing, packaging and/or deploying of a software application. In some software development systems, particularly software development systems for the Java programming language, compilation, testing, packaging and/or deploying rely on build tools utilizing scripts. The scripts provide instructions for compilation, testing, packaging, deploying, and/or any other appropriate operations, references to task executors (e.g., compilers, testers, packagers, deployers, etc.), references to dependencies (e.g., files required for execution of tasks), etc. Typically, the build tools require files to be stored using a predefined directory structure in order to aid the location and identification of the relevant files. The system for determining a task list utilizes this directory structure information for determining a set of tasks. A set of directories for task determination is identified, for example, by ascending from a provided start directory until a project root directory is found, then including all descendants from the project root directory in the set of directories. Determining a task list utilizes a set of plugins, wherein each plugin comprises software for identifying tasks of a particular type in a particular directory. The system for determining a task list iterates through the set of directories for task determination, executing each plugin at each directory to create a list of tasks for building the software project.

In various embodiments, tasks include a compiling task, a testing task, a packaging task, a deploying task, a documentation task, a code signing task, a code auditing task, or any other appropriate task(s).

A system for determining a dependency task tree expands the list of tasks into a dependency task tree for execution. Expanding the list of tasks comprises determining all prerequisite tasks for the tasks of the list of tasks. All prerequisite tasks comprise prerequisite tasks, as well as prerequisite tasks for the prerequisite tasks, etc., until a complete list of tasks is found. The dependency task tree comprises an arrangement of the list of tasks including all prerequisite tasks into a tree, wherein connections in the tree indicate dependencies. A system for executing the dependency task tree comprises a system for executing the tasks as they become available for execution (e.g., as all of their dependencies complete execution). For example, the system for executing the dependency task tree comprises determining a set of tasks of the dependency task tree that do not depend on any other tasks and adding the set of tasks to a task queue. Tasks from the task queue do not depend on each other and can be executed in any order, in series or in parallel. The processor begins executing tasks from the task queue. When an indication of a completed task is received, a determination is made of whether the task completion allows any other tasks to be executed. For example, in the event a dependent task depends on the completed task, the dependent task is checked to determine whether all of its dependencies are complete (e.g., whether any other tasks it depends on have also been completed). In the event all of its dependencies are complete, the dependent task is added to the task queue. Execution of tasks from the task queue continues until all tasks from the task tree have completed execution.

The system makes the computer better by enabling automated compiling, testing, and/or packaging making development of software for the system more efficient. The system enables automated finding of a project root directory, automated execution of creating the compiled software associated with the project, automated testing of the software associated with the project, and automated packaging of the software for deployment and execution. The automation enables a developer for the system to more rapidly create, test, and package projects associated with the system. This includes project discovery (e.g., determining elements and tasks associated with a project), program inference (e.g., gathering of the tasks to create the program to execute), and program execution (e.g., executing the tasks of the program).

In various embodiments, tasks include a compiling task, a testing task, a packaging task, a deploying task, a documentation task, a code signing task, a code auditing task, or any other appropriate task.

FIG. 1 is a block diagram illustrating an embodiment of a network system. In some embodiments, the network system of FIG. 1 comprises a network system for a system for planning. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, administrator system 104, build system 106, and deploy system 108 communicate via network 100.

User system 102 comprises a user system for use by a user. For example, user system 102 comprises a system for communication, data access, computation, etc. A user uses user system 102 to access build system 106. For example, a user uses user system 102 to access build system 106 to develop software, to create software tests, to create software build instructions, to create software packaging instructions, to execute a software build process, etc. Built software is deployed to deploy system 108. For example, built software is deployed to deploy system 108 as part of a software build process executing on build system 106, initiated by a user using user system 102. Administrator system 104 comprises an administrator system for use by an administrator. For example, administrator system 104 comprises a system for communication, data access, computation, etc. An administrator uses administrator system 104 to maintain build system 106 and deploy system 108. For example, an administrator uses administrator system 104 to start and/or stop services on build system 106 or deploy system 108, to reboot build system 106 or deploy system 108, to install software on build system 106 or deploy system 108, to add, modify, and/or remove data on build system 106 or deploy system 108, etc.

Build system 106 comprises a computer system for interacting with a user to develop and build software. In some embodiments, a user using build system 106 (e.g., either directly or via a remote connection, e.g., using user system 102 via network 100) uses an interactive development environment (e.g., an IDE) to develop and build software. For example, build system 106 comprises a system for automatically determining and executing steps to compile, test, package, and/or deploy a program. Build system 106 comprises a system for discovering a task list, comprising an interface configured to receive an indication of a start directory and a set of plugins, wherein the set of plugins is used to determine the task list associated with compiling, testing, packaging, and/or deploying a program, and a processor configured to determine a set of directories for discovering the task list based at least in part on the start directory, for each directory of the set of directories, for each plugin of the set of plugins, apply a selected plugin of the set of plugins to a selected directory of the set of directories to generate a set of tasks, add the set of tasks to the task list, and provide the task list.

Build system 106 additionally comprises a system for determining a dependency task tree, comprising an interface configured to receive a task list, wherein the task list is associated with compiling, testing, packaging, and/or deploying a program, and a processor configured to determine a dependency task tree, wherein the dependency task tree includes all tasks in the task list and all prerequisite tasks for each task in the task list, and provide the dependency task tree. Build system 106 additionally comprises a system for executing a dependency task tree, comprising an interface configured to receive the dependency task tree, wherein the dependency task tree includes tasks associated with compiling, testing, packaging, and/or deploying a program, and a processor configured to determine a set of tasks of the dependency task tree such that a task of the set of tasks does not depend on any other task, add the set of tasks to a task queue, begin executing tasks from the task queue, receive an indication of a completed task, determine a dependent task that depends on the completed task, in response to determining that all dependencies of the dependent task are completed, add the dependent task to the task queue, and continue executing tasks from the task queue until all tasks in the dependency task tree are completed.

Deploy system 108 comprises a system for deploying software. For example, deploy system 108 comprises a system for executing compiled and built software for use by one or more users. In some embodiments, deploy system 108 comprises a system for deploying software for use by a plurality of users accessing deploy system 108 via the Internet.

Figure 2:
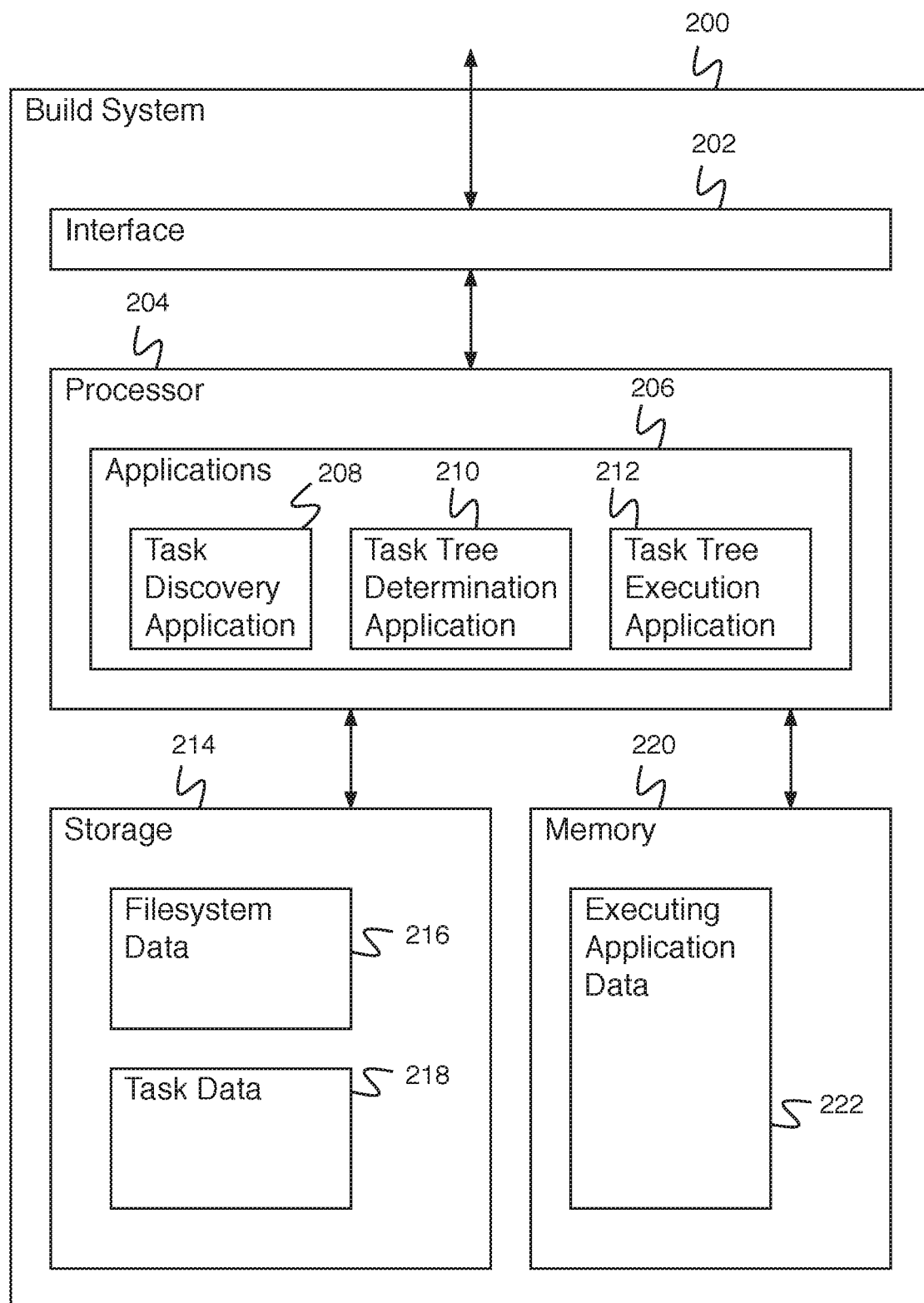
FIG. 2 is a block diagram illustrating an embodiment of a build system.

FIG. 2 is a block diagram illustrating an embodiment of a build system. In some embodiments, build system 200 comprises build system 106 of FIG. 1. In the example shown, build system 200 comprises interface 202. For example, interface 202 comprises an interface for receiving an indication of a start directory (e.g., a start directory of filesystem data 216), receiving an indication of a plugin or a set of plugins, receiving an indication to compile, test, build, and/or deploy a program, etc. Processor 204 comprises a processor for executing applications 206. Applications 206 comprise task discovery application 208, task tree determination application 210, and task tree execution application 212. Task discovery application 208 comprises an application for discovering a set of tasks for building a program. For example, task discovery application 208 is configured to receive an indication of a start directory and a set of plugins, wherein the set of plugins is used to determine the task list associated with compiling, testing, packaging, and/or deploying a program, determine a set of directories for discovering the task list based at least in part on the start directory, for each directory of the set of directories, for each plugin of the set of plugins, apply a selected plugin of the set of plugins to a selected directory of the set of directories to generate a set of tasks, add the set of tasks to the task list, and provide the task list.

Task tree determination application 210 comprises an application for determining a task tree organized by dependency information. For example, task tree determination application 210 is configured to receive a dependency task tree, wherein the dependency task tree includes tasks associated with compiling, testing, packaging, and/or deploying a program, to determine a set of parallel and serial steps for the dependency task tree, and execute the set of parallel and serial steps to compile, test, package, and/or deploy the program. Task tree execution application 212 comprises an application for executing the tasks of a task tree organized by dependency information. For example, task tree execution application 212 is configured to receive a dependency task tree, wherein the dependency task tree includes tasks associated with compiling, testing, packaging, and/or deploying a program, determine a set of tasks of the dependency task tree such that a task of the set of tasks does not depend on any other task, add the set of tasks to a task queue, begin executing tasks from the task queue, receive an indication of a completed task, determine a dependent task that depends on the completed task, in response to determining that all dependencies of the dependent task are completed, add the dependent task to the task queue, and continue executing tasks from the task queue until all tasks in the dependency task tree are completed.

Applications 206 additionally comprises any other appropriate applications (e.g., an index maintenance application, a communications application, a chat application, a web browser application, a document preparation application, a report preparation application, a user interface application, a data analysis application, etc.). Storage 214 comprises filesystem data 216 (e.g., a filesystem data structure storing data (e.g., files) in a nested set of directories) and task data 218 (e.g., a set of tasks determined by task discovery application 208, a task tree determined by task tree determination application 210, etc.). Memory 220 comprises executing application data 222 comprising data associated with applications 206.

Figure 3:
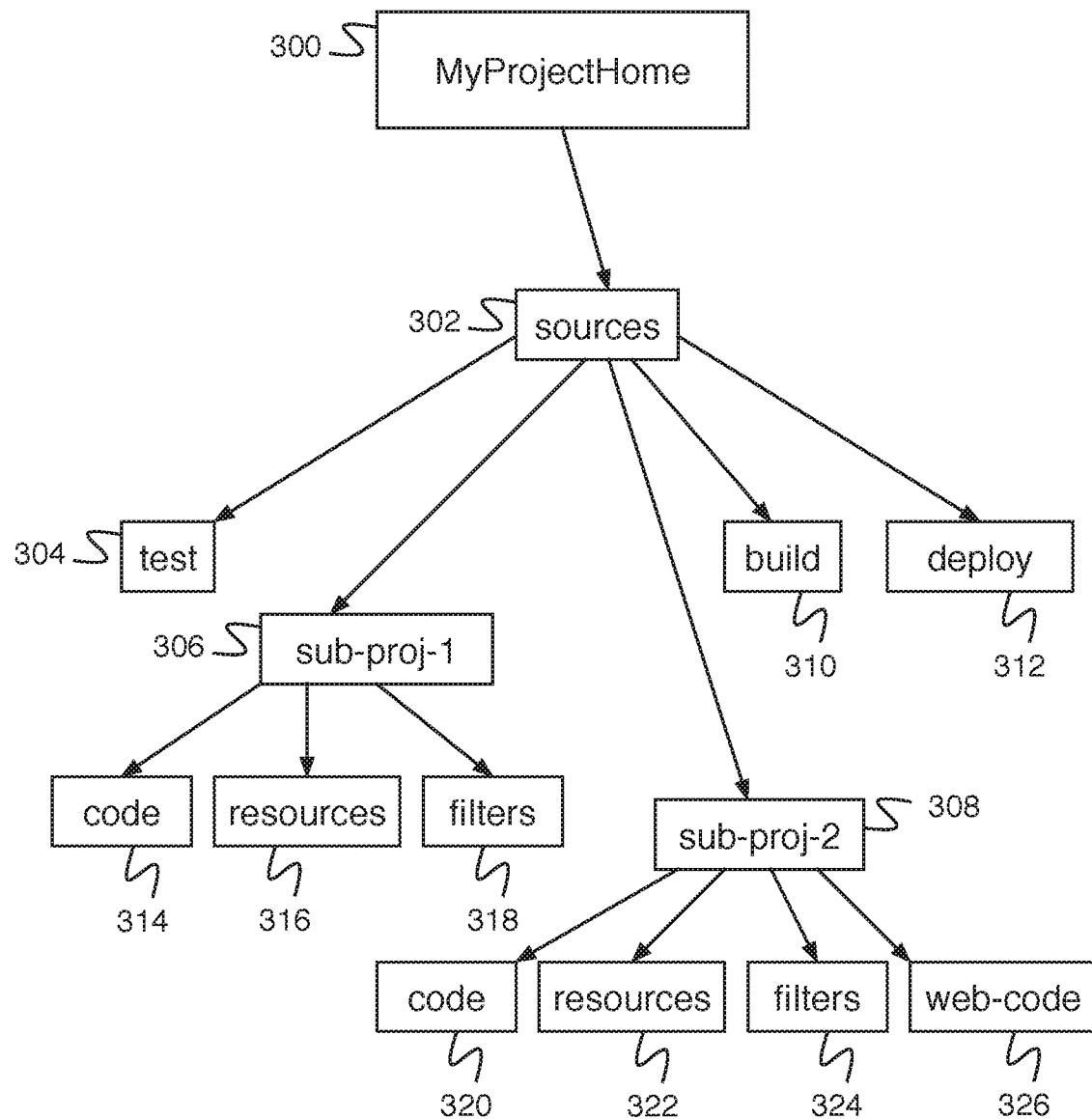
FIG. 3 is a block diagram illustrating an embodiment of a filesystem structure for storing a software project.

FIG. 3 is a block diagram illustrating an embodiment of a filesystem structure for storing a software project. In some embodiments, the filesystem structure of FIG. 3 comprises data stored in filesystem data 216 of FIG. 2. For example, the filesystem structure of FIG. 3 comprises a filesystem structure for a program using the Java programming language. In the example shown, blocks of FIG. 3 comprise directories and arrows indicate a parent directory/subdirectory relationship. Directory MyProjectHome 300 comprises a top-level directory for a project. For example, directory MyProjectHome 300 stores a LICENSE.txt file for storing project license information, a NOTICE.txt file for storing notices and attributions required by libraries the project depends on, a README.txt file for including background information for the project, and any other appropriate top-level files. Directory MyProjectHome 300 stores directory sources 302. Directory sources 302 stores project source code. For example, directory sources 302 comprise a project root directory for a set of directories for discovering a task list. In some embodiments, a top-level project directory (e.g., directory MyProjectHome 300) is not used as a project root directory because it does not store files associated with tasks. In some embodiments, directory MyProjectHome 300 comprises an additional directory (e.g., a target directory) for use in storing project build output files. Directory sources 302 stores five subdirectories, directory test 304, directory sub-proj-1 306, directory sub-proj-2 308, directory build 310, and directory deploy 312. Directory test 304 stores integration test data or test source data, directory sub-proj-1 306 stores code for a first subproject, directory sub-proj-2 308 stores main source data, directory build 310 stores build data, and directory deploy 312 stores deploy data. In various embodiments, directory sources 302 additionally comprises files related to one or more compile, test, build, and/or deploy tasks.

For example, a test plugin detects a test task in directory test 304, a build plugin detects a build task at directory build 310, and a deploy plugin detects a deploy task at directory deploy 312. Directory sub-proj-1 306 comprises directory code 314, directory resources 316, and directory filters 318. Directory code 314 comprises subproject 1 source code, directory resources 316 comprises subproject 1 resources, and directory filters 318 comprises subproject 1 resource filter files. For example, a compilation plugin detects a compile task at directory code 314, a resource plugin detects a resource task at directory resources 316, and a filter plugin detects a filter task at directory filters 318. In some embodiments, a compilation plugin detects compilation tasks at directory code 314, directory resources 316, and directory filters 318, or a compilation plugin detects one or more compilation tasks at directory sub-proj-1 306 utilizing the contents of directory code 314, directory resources 316, and/or directory filters 318. Directory sub-proj-2 308 comprises directory code 320, directory resources 322, directory filters 324, and directory web-code 326. Directory code 320 comprises subproject 2 source code, directory resources 322 comprises subproject 2 resources, directory filters 324 comprises subproject 2 filter files, and directory web-code 326 comprises subproject 2 webapp source code. For example, a compilation plugin detects a compile task at directory code 320, a resource plugin detects a resource task at directory resources 322, a filter plugin detects a filter task at directory filters 324, and a webapp compilation plugin detects a webapp compilation task at directory web-code 326. In some embodiments, a compilation plugin detects compilation tasks at directory code 320, directory resources 322, directory filters 324, and directory web-code 326, or a compilation plugin detects one or more compilation tasks at directory sub-proj-2 308 utilizing the contents of directory code 320, directory resources 322, directory filters 324 and/or directory web-code 326.

Figure 4:
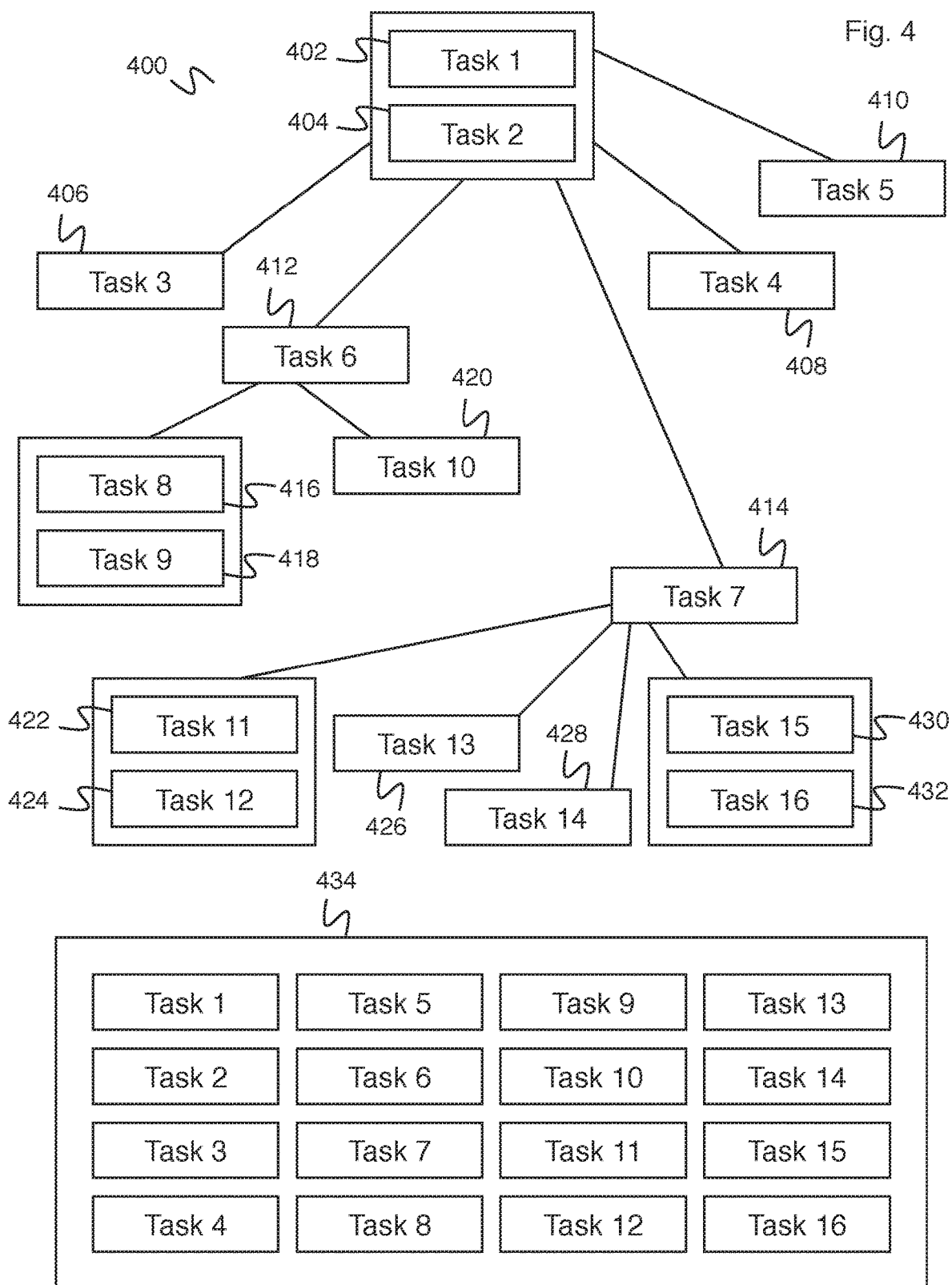
FIG. 4 is a block diagram illustrating an embodiment of a task tree and a task list.

FIG. 4 is a block diagram illustrating an embodiment of a task tree and a task list. In some embodiments, the task tree and task list of FIG. 4 are associated with the filesystem structure of FIG. 3. In the example shown, task tree 400 of FIG. 4 is arranged to parallel the directory tree structure of the filesystem structure of FIG. 3. Task tree 400 comprises 16 tasks arranged in a hierarchical structure. In various embodiments, tasks depend on tasks identified at lower levels in a filesystem structure or tasks do not necessarily depend on tasks identified at lower levels in a filesystem structure. In the example shown, task 1 402 and task 2 404 are located at a root node of task tree 400. For example, task 1 402 and task 2 404 comprise tasks identified at a project root directory of a project. Task 3 406, task 4 408, task 5 410, task 6 412, and task 7 414 comprise tasks identified at directories subordinate to the project root directory. Task 8 416 and task 9 418 comprise tasks identified at a first directory subordinate to the directory associated with task 6 412; task 10 420 comprises a task identified at a second directory subordinate to the directory associated with task 6 412. Task 11 and task 12 comprises tasks identified at a first directory subordinate to the directory associated with task 7 414; task 13 426 comprises a task identified at a second directory subordinate to the directory associated with task 7 414; task 14 428 comprises a task identified at a third directory subordinate to the directory associated with task 7 414; and task 15 430 and task 16 432 comprise tasks identified at a fourth directory subordinate to the directory associated with task 7 414. Task list 434 comprises a task list comprising all tasks identified in the task discovery process.

Figure 5:
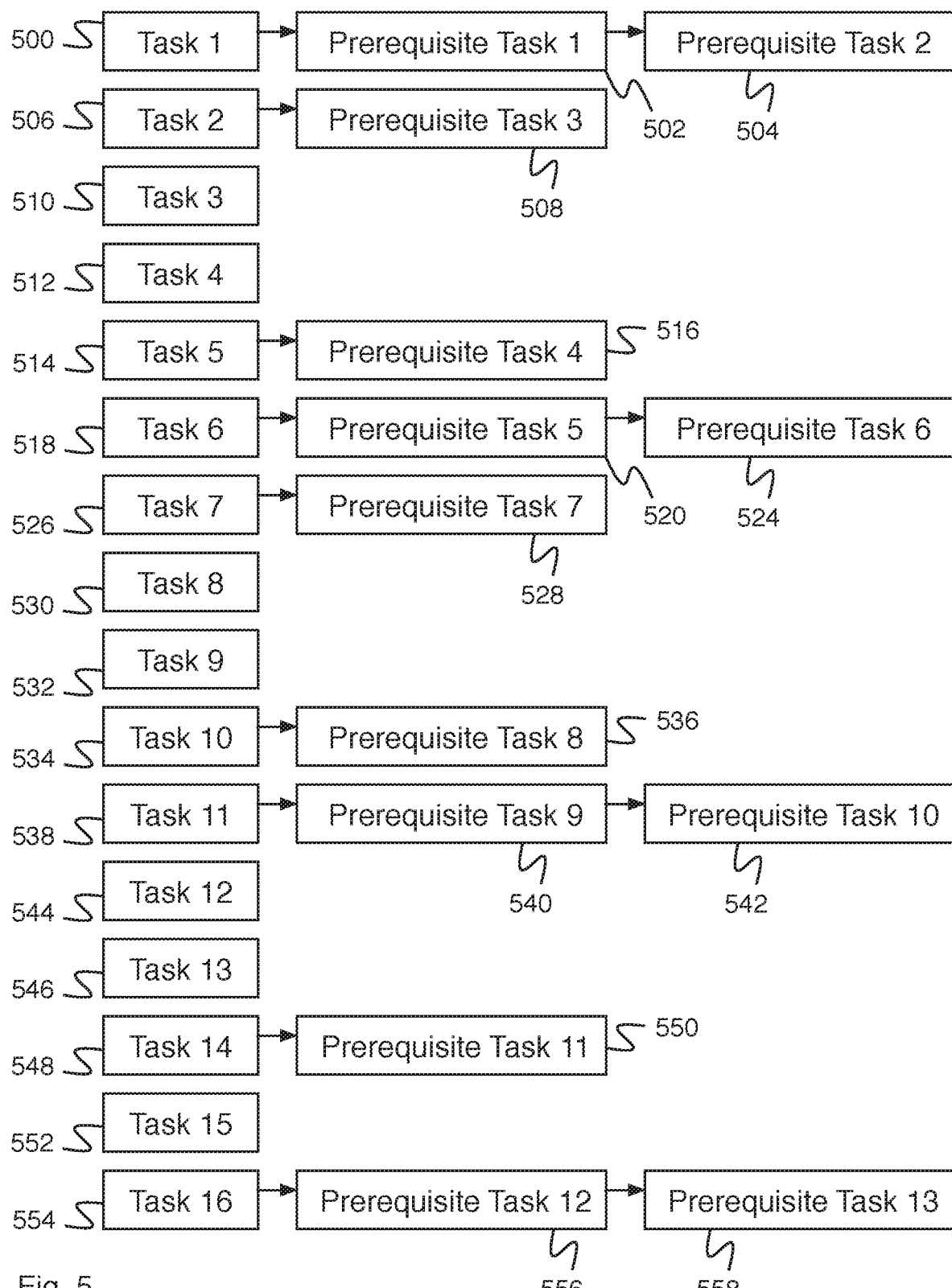
FIG. 5 is a block diagram illustrating an embodiment of task dependence.

FIG. 5 is a block diagram illustrating an embodiment of task dependence. In some embodiments, the block diagram of FIG. 5 illustrates task dependencies of the tasks of task tree 400 of FIG. 4 on prerequisite tasks outside of the tasks identified in FIG. 4. In the example shown, task 1 500 depends on prerequisite task 502, which in turn depends on prerequisite task 2 504. Prerequisite task 2 504 has no prerequisite. Task 2 506 depends on prerequisite task 3 508. Prerequisite task 3 508 has no prerequisite. Task 3 510 and task 4 512 have no prerequisite. Task 5 514 depends on prerequisite task 4 516, which has no prerequisite. Task 6 518 depends on prerequisite task 5 520, which depends on prerequisite task 6 524. Prerequisite task 6 524 has no prerequisite. Task 7 526 depends on prerequisite task 7 528, which has no prerequisite. Task 8 530 and task 9 532 have no prerequisite. Task 10 534 depends on prerequisite task 536, which has no prerequisite. Task 11 538 depends on prerequisite task 9 540, which depends on prerequisite task 10 542. Prerequisite task 10 542 has no prerequisite. Task 12 544 and task 13 546 have no prerequisite. Task 14 548 depends on prerequisite task 11 550, which has no prerequisite. Task 15 552 has no prerequisite. Task 16 554 depends on prerequisite task 12, which depends on prerequisite task 13 558. Prerequisite task 13 558 has no prerequisite.

Figure 6A:
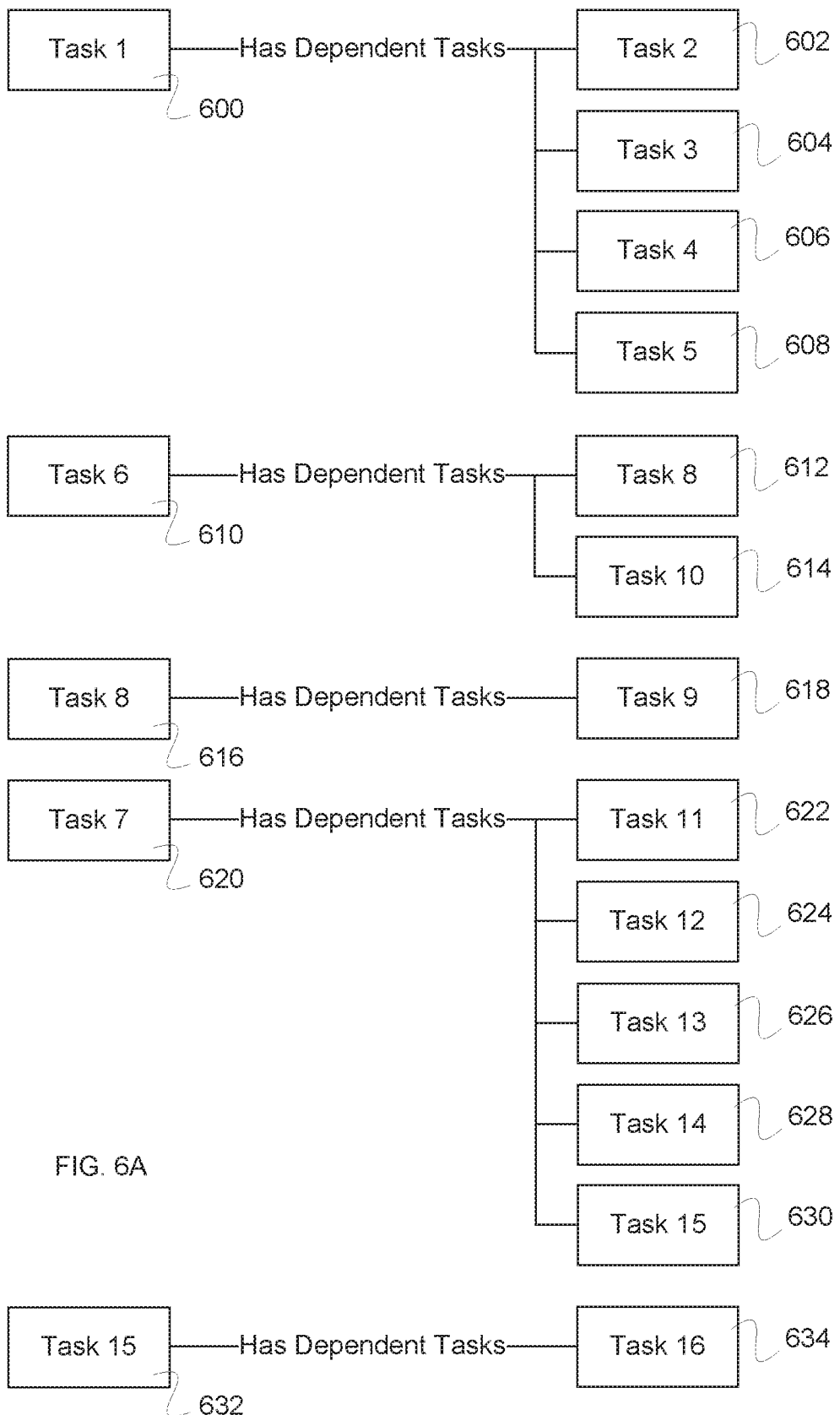
FIG. 6A is a block diagram illustrating an embodiment of task dependence.

FIG. 6A is a block diagram illustrating an embodiment of task dependence. In some embodiments, task dependencies of FIG. 6A are based on task dependencies discovered in FIG. 4. In the example shown, task 1 600 has dependent tasks: task 2 602, task 3 604, task 4 606, and task 5 608. Task 6 610 has dependent tasks: task 8 612 and task 10 614. Task 8 616 has a dependent task: task 9 618. Task 7 620 have dependent tasks: task 11 622, task 12 624, task 13 626, task 14 628, and task 15 630. Task 15 632 has a dependent task: task 16 634.

Figure 6B:
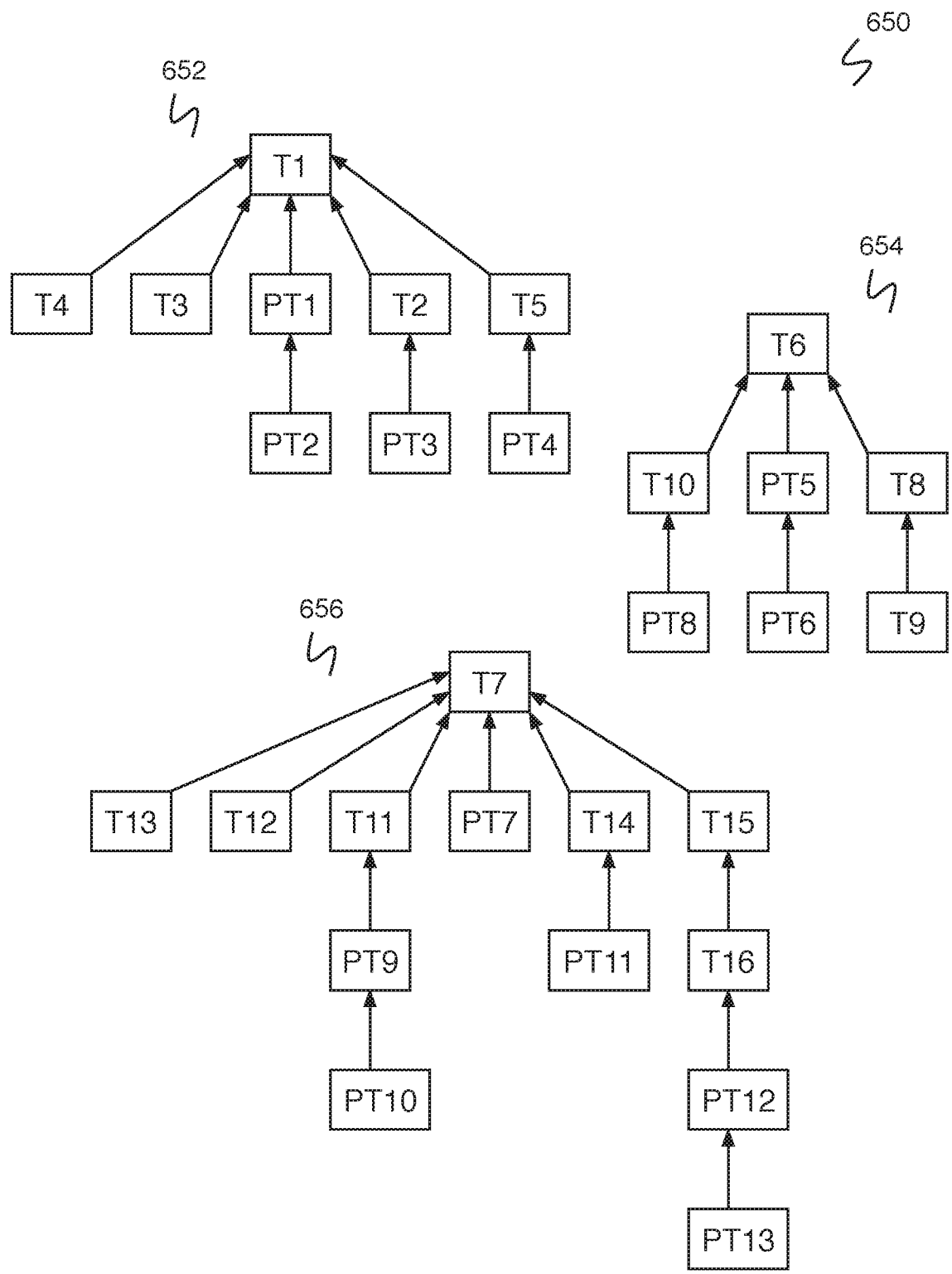
FIG. 6B is a block diagram illustrating an embodiment of a dependency task tree.

FIG. 6B is a block diagram illustrating an embodiment of a dependency task tree. Dependency task tree 650 comprises a dependency task tree associated with the dependencies of tasks shown in task tree 400 of FIG. 4 as indicated by the dependencies as shown in FIG. 5 and FIG. 6A. In the example shown, dependency task tree 650 comprises three independent subtrees. A first independent subtree of dependency task tree 650 comprises independent subtree 652. Independent subtree 652 comprises task 1 at its head. Task 1 depends on task 2, task 3, task 4, task 5, and prerequisite task 1. Task 5 depends on prerequisite task 4, task 2 depends on prerequisite task 3, and prerequisite task 1 depends on prerequisite task 4. A second independent subtree of dependency task tree 650 comprises independent subtree 654. Independent subtree 654 comprises task 6 at its head. Task 6 depends on task 10, task 8, and prerequisite task 5. Task 10 depends on prerequisite task 8, task 8 depends on task 9, and prerequisite task 5 depends on prerequisite task 6. A third independent subtree of dependency task tree 650 comprises independent subtree 656. Independent subtree 656 comprises task 7 at its head. Task 7 depends on task 11, task 12, task 13, task 14, task 15, and prerequisite task 14. Task 11 depends on prerequisite task 9, which depends on prerequisite task 10. Task 14 depends on prerequisite task 11. Task 15 depends on task 16, which depends on prerequisite task 12, which depends on prerequisite task 13.

Independent subtree 652, independent subtree 654, and independent subtree 656 are independent and can be executed in parallel.

Figure 7:
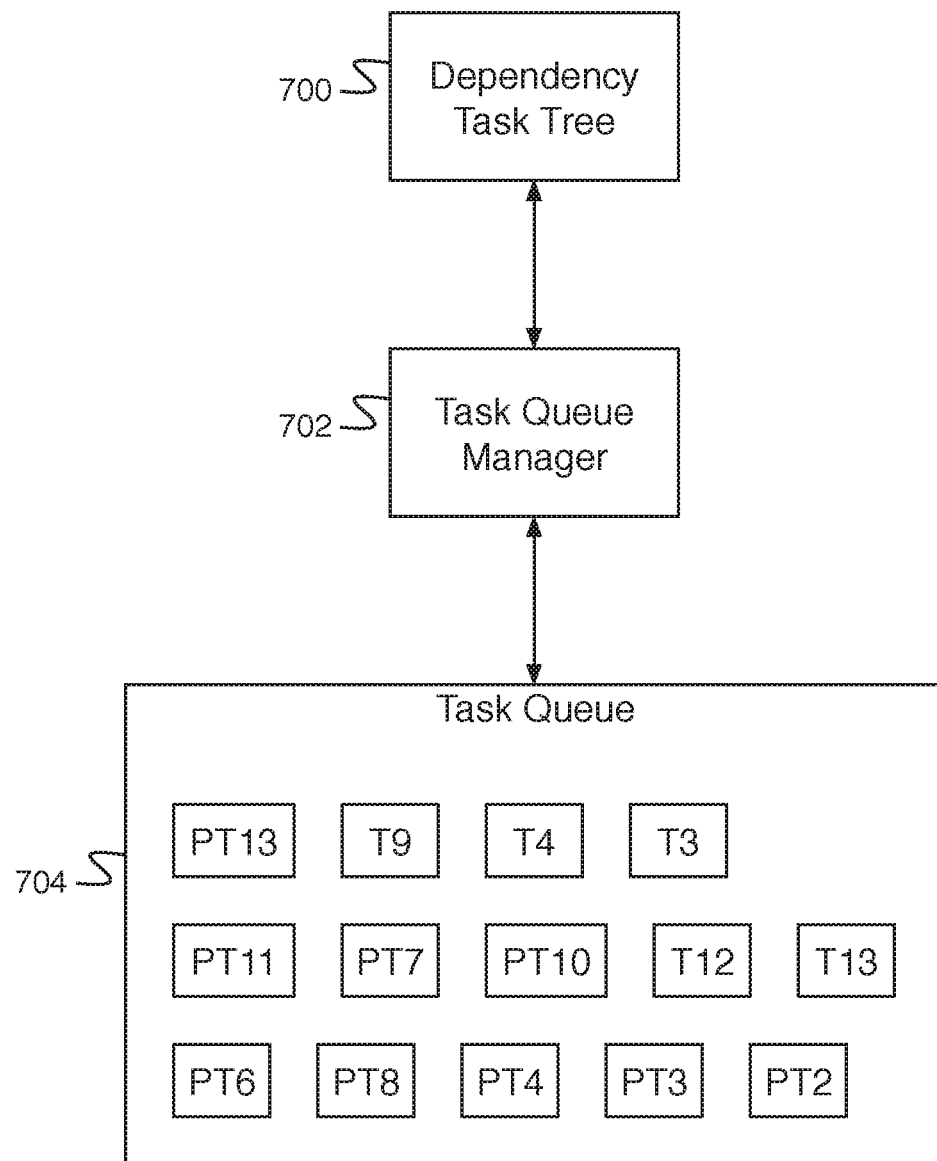
FIG. 7 is a block diagram illustrating an embodiment of a task queue manager and task queue.

FIG. 7 is a block diagram illustrating an embodiment of a task queue manager and task queue. In some embodiments, the task executor and task queue of FIG. 7 comprise a task queue manager and task queue for executing tasks from dependency task tree 600 of FIG. 6. Dependency task tree 700 comprises a dependency task tree, comprising a set of tasks for execution arranged by dependency, including connections indicating tasks dependent on a task. Task queue manager 702 comprises a process for executing tasks—for example, for determining a task to execute, determining a task executor for executing the task, causing the task executor to execute the task, receiving an indication that task execution is complete, removing a completed task from task queue 704, determining a task to add to task to task queue 704, adding a task to task queue 704, etc. When a task execution process begins, task queue manager 702 determines a set of tasks from dependency task tree 700 that can be executed without executing any other tasks. For example, task queue manager 702 determines the set of leaf nodes of dependency task tree 700. The set of tasks from dependency task tree 700 that can be executed without executing any other tasks is added to task queue 704. In the example shown, task queue 704 comprises the set of tasks from dependency task tree 600 of FIG. 6 that can be executed without executing any other tasks. Task queue manager 702 then initiates execution for each task in task queue 704. Tasks in task queue 704 do not depend on each other and may be executed in any order or in parallel. Any appropriate number of tasks may be executed simultaneously (e.g., task queue manager 702 determines how many tasks to execute simultaneously based at least in part on a measured processor load). When task queue manager 702 determines that a task is completed (e.g., task queue manager 702 monitors a task executor executing a task and/or task queue manager 702 receives a complete indication from a task executor executing a task), task queue manager 702 removes the task from task queue 704. Task queue manager 702 additionally determines any tasks that depended on the completed task. For example, tasks that depended on the completed task comprise tasks indicated by an arrow leaving the completed task in the dependency task tree. Task queue manager 702 then determines whether a task that depended on the completed task can be executed. For example, the task that depended on the completed task can be executed in the event that all tasks it depends on have been completed. In response to task queue manager 702 determining that the task that depended on the completed task can be executed, task queue manager 702 adds the task that depended on the completed task to the task queue. Execution proceeds until all tasks in the dependency task tree are executed.

Figure 8:
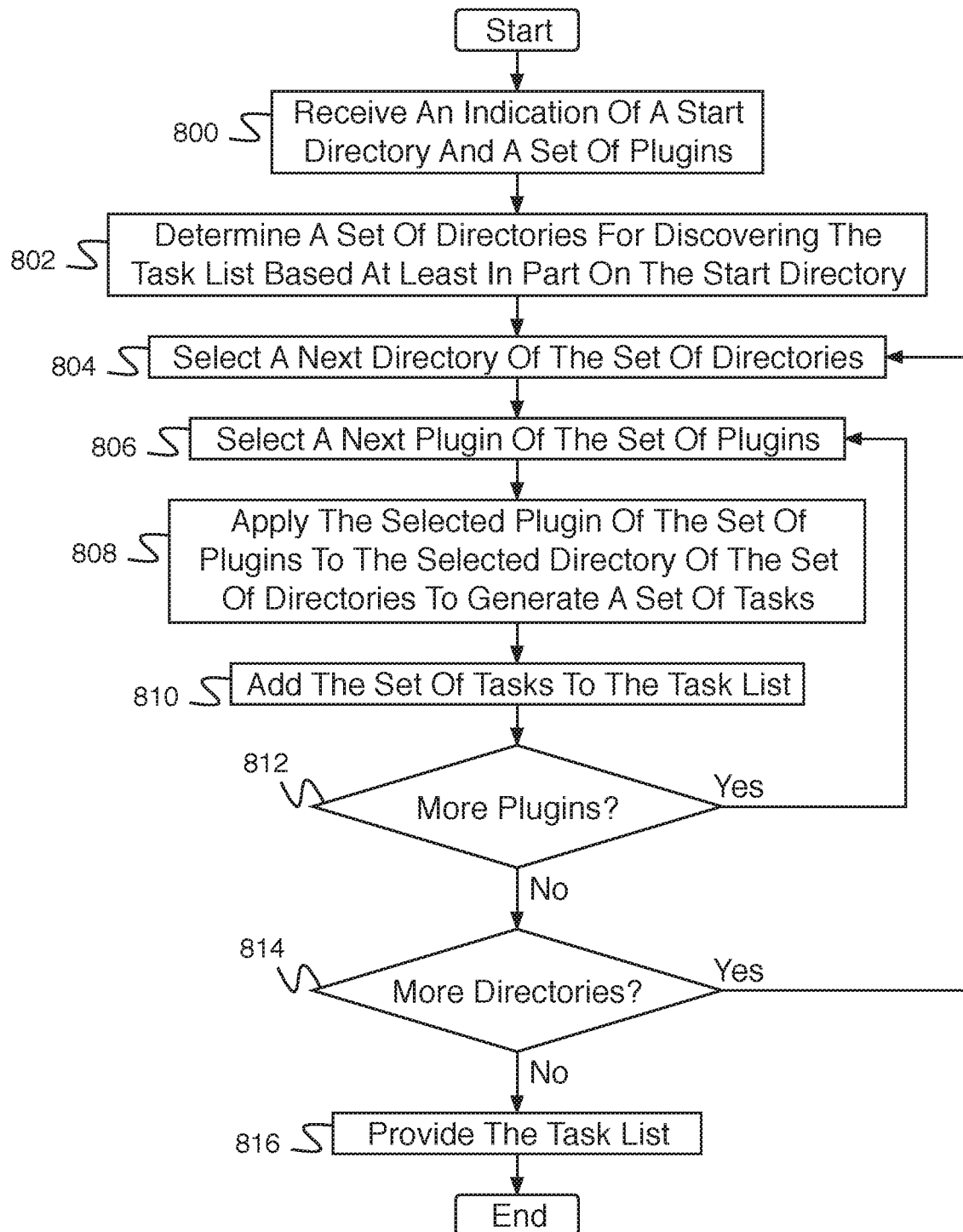
FIG. 8 is a flow diagram illustrating an embodiment of a process for discovering a task list.

FIG. 8 is a flow diagram illustrating an embodiment of a process for discovering a task list. In some embodiments, the process of FIG. 8 is executed by build system 106 of FIG. 1. In the example shown, in 800, an indication of a start directory and a set of plugins is received. For example, the set of plugins is used to determine the task list associated with compiling, testing, packaging, and/or deploying a program. In some embodiments, the task list comprises tasks necessary for creating the program. For example, the program is compiled, tested, packaged, and/or deployed using the task list. For example, the program is written in the Java™ programming language. In 802, a set of directories for discovering the task list is determined based at least in part on the start directory. In some embodiments, the set of directories comprises all directories associated with the program. In some embodiments, the task list is initialized to an empty task list. In 804, a next directory of the set of directories is selected. In some embodiments, the next directory comprises the first directory. In 806, a next plugin of the set of plugins is selected. In some embodiments, the next plugin comprises the first plugin. In 808, the selected plugin of the set of plugins is applied to the selected directory of the set of directories to generate a set of tasks. For example, the selected plugin comprises software for analyzing the selected directory of the set of directories and reporting the set of tasks of a task type associated with the selected directory. In some embodiments, applying the selected plugin to the selected directory comprises executing the selected plugin including the selected directory as an input argument to the selected plugin, wherein the selected plugin reports the set of tasks associated with the selected directory based at least in part on files stored in the selected directory. For example, each plugin of the set of plugins is associated with a task type of a set of task types. In some embodiments, the selected plugin of the set of plugins is associated with one or more task executors for executing tasks identified by the selected plugin. For example, a task executor of the one or more task executors comprises a compiler, a tester, a packager, or a deployer. In 810, the set of tasks is added to the task list. In 812, it is determined whether there are more plugins. In the event it is determined that there are more plugins, control passes to 806. In the event it is determined that there are not more plugins, control passes to 814. In 814, it is determined whether there are more directories. In the event it is determined that there are more directories, control passes to 804. For example, the set of plugins are all applied to all directories of the set of directories. In the event it is determined that there are not more directories, control passes to 816. In 816, the task list is provided. In some embodiments, the task list comprises a task tree. For example, a task tree comprises a set of tasks wherein the tasks are stored in a tree corresponding to the directory hierarchy where the tasks were located.

Figure 9:
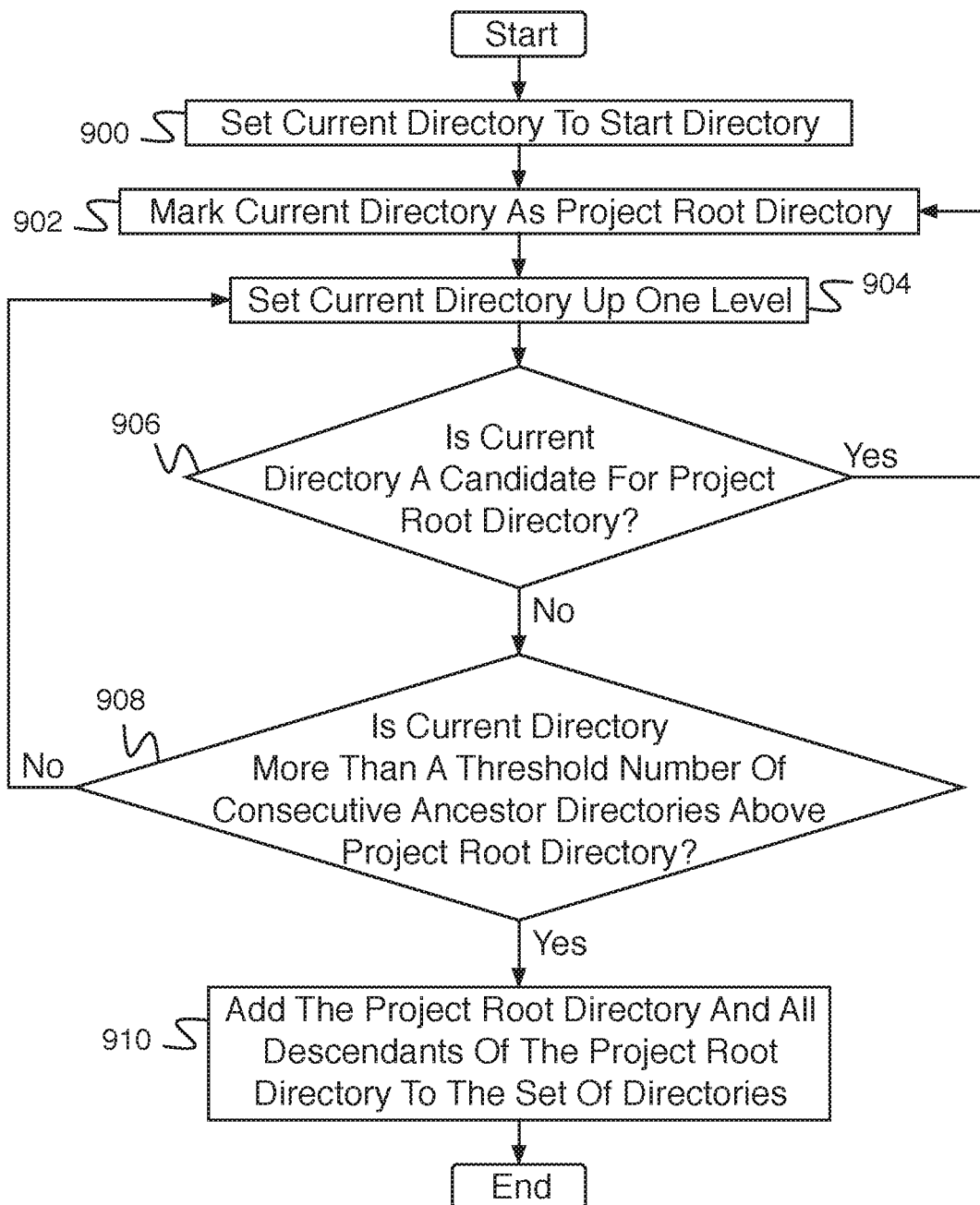
FIG. 9 is a flow diagram illustrating an embodiment of a process for determining a set of directories for discovering a task list based at least in part on a start directory.

FIG. 9 is a flow diagram illustrating an embodiment of a process for determining a set of directories for discovering a task list based at least in part on a start directory. In some embodiments, the process of FIG. 9 implements 802 of FIG. 8. In the example shown, in 900, the current directory is set to the start directory. In 902, the current directory is marked as the project root directory. In 904, the current directory is set up one level (e.g., to the parent directory of the current directory). In 906, it is determined whether the current directory is a candidate for the project root directory. For example, determining whether the current directory is a candidate for the project root directory comprises determining whether the one or more files are stored in the current directory, determining whether the one or more directories are stored in the current directory, determining whether the directory comprises two or more immediate child directories associated with tasks, determining whether the current directory is associated with a task, or determining whether the current directory is a candidate for the project root directory in any other appropriate way. In the event it is determined that the current directory is a candidate for the project root directory, control passes to 902. In the event it is determined that the current directory is not a candidate for the project root directory, control passes to 908. For example, the project root directory comprises the start directory or an ancestor of the start directory. In 908, it is determined whether the current directory is more than a threshold number of consecutive ancestor directories above the project root directory. For example the project root directory comprises the start directory or a furthest ancestor directory of the start directory such that no more than a threshold number of consecutive ancestor directories between the start directory and the project root directory are not candidates for project root directory (e.g., are not associated with tasks). In response to determining that the current directory is not more than a threshold number of consecutive ancestor directories above the project root directory, control passes to 908. In response to determining that the current directory is more than a threshold number of consecutive ancestor directories above the project root directory, control passes to 910. In 910, the project root directory and all descendants of the project root directory are added to the set of directories.

Figure 10:
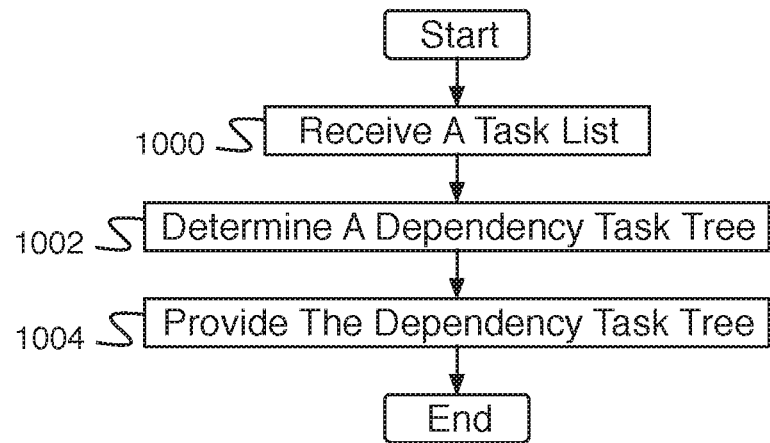
FIG. 10 is a flow diagram illustrating an embodiment of a process for determining a dependency task tree.

FIG. 10 is a flow diagram illustrating an embodiment of a process for determining a dependency task tree. In some embodiments, the process of FIG. 10 is executed by build system 106 of FIG. 1. In the example shown, in 1000, a task list is received, wherein the task list is associated with compiling, testing, packaging, and/or deploying a program. In 1002, a dependency task tree is determined, wherein the dependency task tree includes all tasks in the task list and all prerequisite tasks for each task in the task list. For example, all prerequisite tasks of any task in the dependency task tree are included in the dependency task tree. In 1004, the dependency task tree is provided. For example, executing the tasks of the dependency task tree comprises compiling, testing, packaging, and/or deploying a program. Connections of the dependency task tree indicate task dependencies. For example, independent subtrees of the dependency task tree can be executed in parallel. In some embodiments, a request to execute a task is additionally received. In some embodiments, a request task tree comprising a subtree of the dependency task tree including the task of the request as the request task tree head is determined. For example, the request task tree comprises the subtree of the dependency task tree required for executing the requested task.

Figure 11:
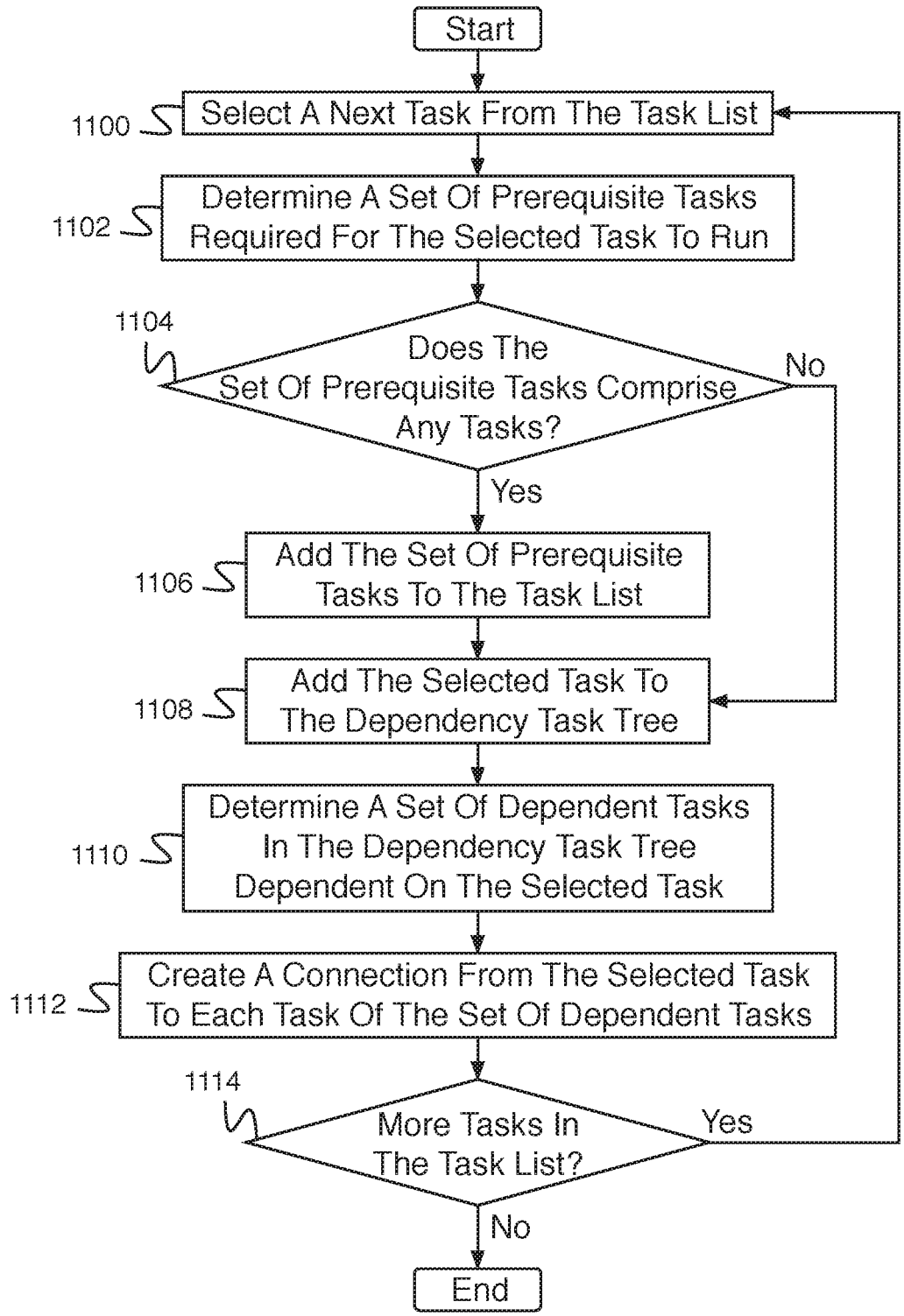
FIG. 11 is a flow diagram illustrating an embodiment of a process for determining a dependency task tree.

FIG. 11 is a flow diagram illustrating an embodiment of a process for determining a dependency task tree. In some embodiments, the process of FIG. 11 implements 1002 of FIG. 10. In the example shown, in 1100, a next task is selected from the task list. In some embodiments, the next task comprises the first task. In 1102, a set of prerequisite tasks required for the selected task to run are determined. In 1104, it is determined whether the set of prerequisite tasks comprises any tasks. In the event the set of prerequisite tasks does not comprise any tasks, control passes to 1108. In the event the set of prerequisite tasks comprises any tasks, control passes to 1106. In 1106, the set of prerequisite tasks is added to the task list. For example, the set of prerequisite tasks is added to the task list such that the tasks of the set of tasks are selected in future iterations of step 1100. In 1108, the selected task is added to the dependency task tree. In 1100, a set of dependent tasks of the dependency task tree that are dependent on the selected task are determined. In 1112, a connection from the selected task to each task of the set of dependent tasks is created. For example, a leaf node of the dependency task tree comprises a task with no dependencies. In 1114, it is determined whether there are more tasks in the task list. In the event it is determined that there are more tasks in the task list, control passes to 1100. For example, returning control to 1100 comprises repeating determining all prerequisite tasks for each prerequisite task of the set of prerequisite tasks until there are no more prerequisite tasks. In the event it is determined that there are not more tasks in the task list, the process ends.

Figure 12:
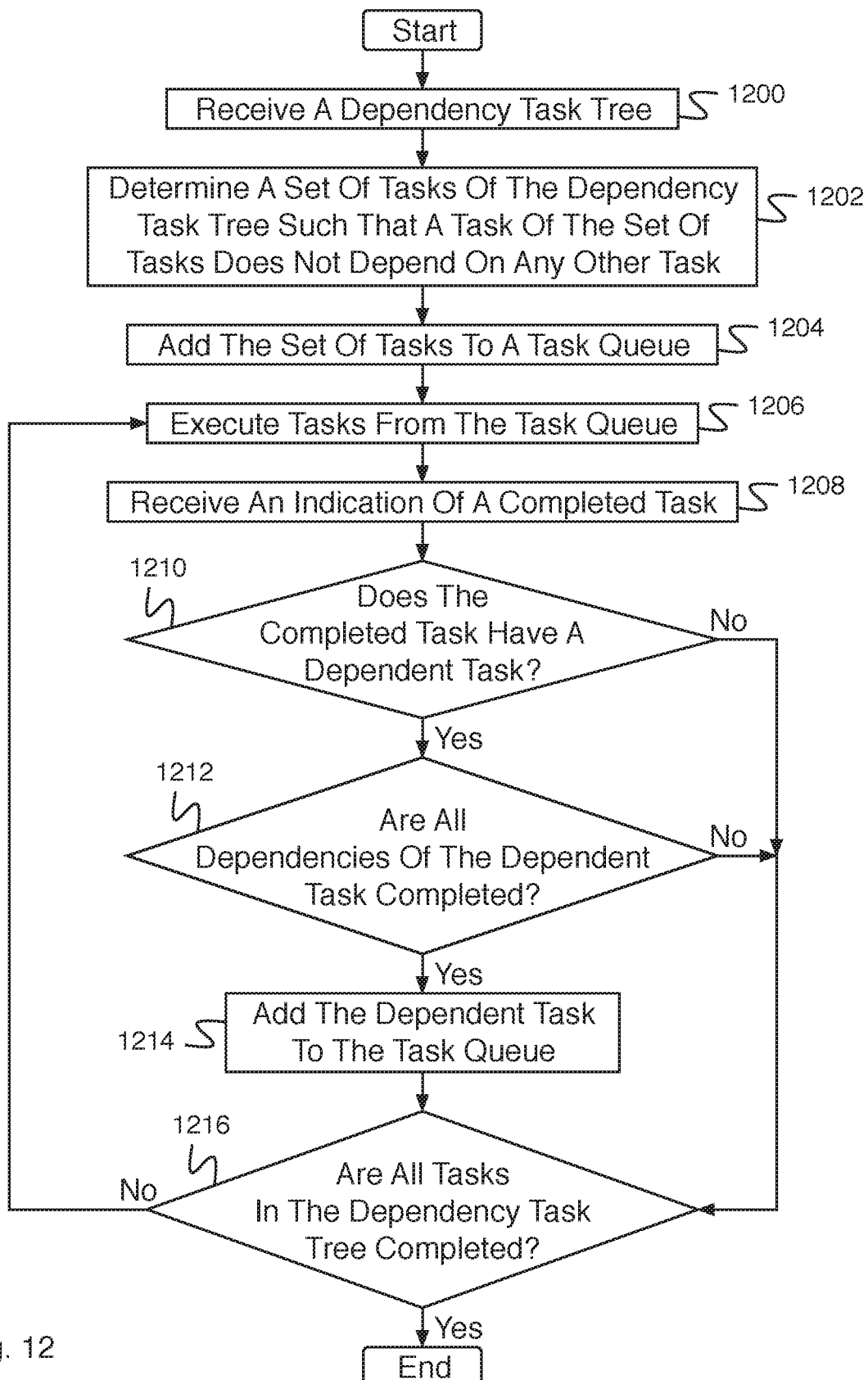
FIG. 12 is a flow diagram illustrating an embodiment of a process for executing a dependency task tree.

FIG. 12 is a flow diagram illustrating an embodiment of a process for executing a dependency task tree. In some embodiments, the process of FIG. 12 is executed by build system 106 of FIG. 1. In the example shown, in 1200, a dependency task tree is received, wherein the dependency task tree includes tasks associated with compiling, testing, packaging, and/or deploying a program. For example, the program comprises a program written in the Java programming language. In 1202, a set of tasks of the dependency task tree is determined such that a task of the set of tasks does not depend on any other task. For example, the set of tasks of the dependency task tree comprises the set of leaf nodes of the dependency task tree. In 1204, the set of tasks is added to a task queue. In 1206, tasks from the task queue are executed. For example, the process begins executing tasks from the task queue. In various embodiments, tasks from the task queue are executed in parallel or in series. In 1208, an indication of a completed task is received. In 1210, it is determined whether the completed task has a dependent task (e.g., whether a dependent task exists that depends on the completed task). In the event it is determined that the completed task does not have a dependent task, control passes to 1216. In the event it is determined that the completed task has a dependent task, control passes to 1212. In 1212, it is determined whether all dependencies of the dependent task are completed. For example, in the event the dependent task has more than one dependency, all dependencies of the dependent task may or may not be completed. In the event it is determined that all dependencies of the dependent task are not completed, control passes to 1216. In the event it is determined that all dependencies of the dependent task are completed, control passes to 1214. In 1214, the dependent task is added to the task queue. In some embodiments, the dependent task comprises one of a plurality of dependent tasks (e.g., a plurality of dependent tasks exist that depend on the completed task). In the event the dependent task comprises one of a plurality of dependent tasks, 1212 and 1214, if necessary, are performed for each dependent task of the plurality of dependent tasks. In 1216, it is determined whether all tasks in the dependency task tree are completed. In the event it is determined that all tasks in the dependency task tree are not completed, control passes to 1206. For example, the process continues executing tasks from the task queue. In the event it is determined in 1216 that all tasks in the dependency task tree are completed, the process ends.

Figure 13:
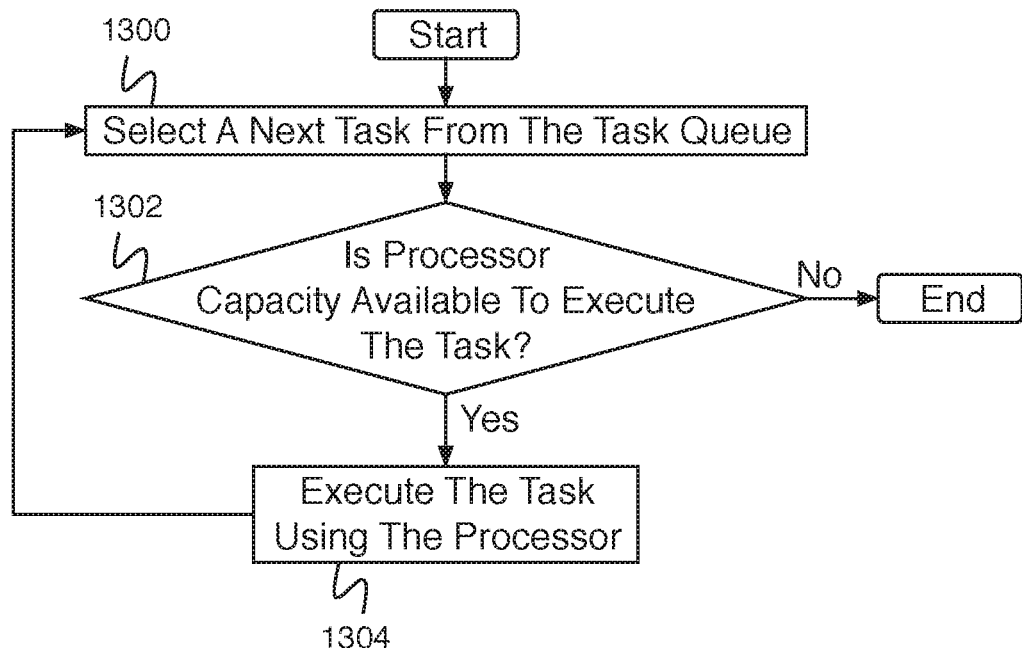
FIG. 13 is a flow diagram illustrating an embodiment of a process for executing tasks from a task queue.

FIG. 13 is a flow diagram illustrating an embodiment of a process for executing tasks from a task queue. In some embodiments, the process of FIG. 13 implements 1206 of FIG. 12. For example, the process of FIG. 13 comprises a process for beginning to execute tasks from the task queue or continuing to execute tasks from the task queue. In the example shown, in 1300, a next task is selected from the task queue. In various embodiments, the next task comprises the newest task, the oldest task, the task estimated to be the shortest to complete, the task estimated to be the longest to complete, the task estimated to use the least processing power, the task estimated to use the most processing power, the task estimated to use the most processing power within the available processor capacity, etc. In 1302, it is determined whether processor capacity is available to execute the task. In the event it is determined that processor capacity is not available to execute the task, the process ends. For example, the number of tasks to execute in parallel is based at least in part on processor resources. In the event it is determined that processor capacity is available to execute the task, control passes to 1304. In 1304 the task is executed using the processor. For example, the task is executed using the processor by an executing service associated with the task. Control then passes to 1300.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for discovering a task list, comprising:
an interface configured to receive an indication of a start directory and a set of plugins, wherein the set of plugins is used to determine the task list associated with a program; and
a processor configured to:
determine a set of directories for discovering the task list based at least in part on the start directory, wherein determining the set of directories for discovering the task list based at least in part on the start directory comprises determining a project root directory, wherein the project root directory comprises the start directory or an ancestor directory of the start directory, wherein the project root directory comprises the start directory or a furthest ancestor directory of the start directory such that no more than a threshold number of consecutive ancestor directories between the start directory and the project root directory are not associated with tasks;
for each directory of the set of directories:
for each plugin of the set of plugins:
apply a selected plugin of the set of plugins to a selected directory of the set of directories to generate a set of tasks;
add the set of tasks to the task list; and
provide the task list.

2. The system of claim 1, wherein the set of directories for discovering the task list comprises all directories associated with the program.

3. The system of claim 1, wherein the task list comprises tasks necessary for creating the program.

4. The system of claim 1, wherein the program is written in a Java programming language.

5. The system of claim 1 wherein the project root directory is determined based at least in part on presence of one or more files.

6. The system of claim 1 wherein the project root directory is determined based at least in part on presence of one or more directories.

7. The system of claim 1, wherein the set of directories for discovering the task list comprises descendant directories of the project root directory.

8. The system of claim 1, wherein the selected plugin comprises software for analyzing the selected directory of the set of directories and reporting the set of tasks of a task type associated with the selected directory.

9. The system of claim 1, wherein applying the selected plugin to the selected directory comprises executing the selected plugin including the selected directory as an input argument to the selected plugin, wherein the selected plugin reports the set of tasks associated with the selected directory based at least in part on files stored in the selected directory.

10. The system of claim 1, wherein the set of plugins are all applied to all directories of the set of directories.

11. The system of claim 1, wherein the selected plugin of the set of plugins is associated with one or more task executors for executing tasks identified by the selected plugin.

12. The system of claim 11, wherein a task executor of the one or more task executors comprises a compiler, a tester, a packager, or a deployer.

13. The system of claim 1, wherein the task list comprises a task tree.

14. The system of claim 13, wherein the task tree comprises a tree of tasks structured to parallel a structure of the set of directories.

15. The system of claim 1, wherein the task list includes one or more of: a compiling task, a testing task, a packaging task, a deploying task, a documentation task, a code signing task, and/or a code auditing task a program.

16. A method for discovering a task list, comprising:
receiving an indication of a start directory and a set of plugins, wherein the set of plugins is used to determine the task list associated with a program;
determining, using a processor, a set of directories for discovering the task list based at least in part on the start directory, wherein determining the set of directories for discovering the task list based at least in part on the start directory comprises determining a project root directory, wherein the project root directory comprises the start directory or an ancestor directory of the start directory, wherein the project root directory comprises the start directory or a furthest ancestor directory of the start directory such that no more than a threshold number of consecutive ancestor directories between the start directory and the project root directory are not associated with tasks; and
for each directory of the set of directories:
for each plugin of the set of plugins:
apply a selected plugin of the set of plugins to a selected directory of the set of directories to generate a set of tasks;
add the set of tasks to the task list; and
provide the task list.

17. A computer program product for discovering a task list, the computer program product being embodied in a non-transitory computer readable storage medium and comprising computer instructions for:
receiving an indication of a start directory and a set of plugins, wherein the set of plugins is used to determine the task list associated with a program;
determining a set of directories for discovering the task list based at least in part on the start directory, wherein determining the set of directories for discovering the task list based at least in part on the start directory comprises determining a project root directory, wherein the project root directory comprises the start directory or an ancestor directory of the start directory, wherein the project root directory comprises the start directory or a furthest ancestor directory of the start directory such that no more than a threshold number of consecutive ancestor directories between the start directory and the project root directory are not associated with tasks; and
for each directory of the set of directories:
for each plugin of the set of plugins:
apply a selected plugin of the set of plugins to a selected directory of the set of directories to generate a set of tasks;
add the set of tasks to the task list; and
provide the task list.

\* \* \* \* \*

UNITED STATES PATENT AND TRADEMARK OFFICE
CERTIFICATE OF CORRECTION

| | |
|---|---|
| PATENT NO. | : 11,360,805 B1 |
| APPLICATION NO. | : 16/926491 |
| DATED | : June 14, 2022 |
| INVENTOR(S) | : Brian Oliver |

Page 1 of 1

It is certified that error appears in the above-identified patent and that said Letters Patent is hereby corrected as shown below:

In the Claims

Column 13, Line 42, Claim 5, after "claim 1", insert --,--.

Column 13, Line 45, Claim 6, after "claim 1", insert --,--.

Signed and Sealed this
Thirty-first Day of January, 2023

Katherine Kelly Vidal
*Director of the United States Patent and Trademark Office*